April 8, 1952     A. E. POULSEN     2,591,721
MACHINE FOR PROCESSING MATERIALS
Filed Oct. 18, 1949     2 SHEETS—SHEET 1

INVENTOR.
ALFRED E. POULSEN
BY HIS ATTORNEYS.
HARRIS, KIECH, FOSTER & HARRIS

INVENTOR.
ALFRED E. POULSEN
BY HIS ATTORNEYS.
HARRIS, KIECH, FOSTER & HARRIS

Patented Apr. 8, 1952

2,591,721

UNITED STATES PATENT OFFICE 2,591,721

MACHINE FOR PROCESSING MATERIALS

Alfred E. Poulsen, Los Angeles, Calif., assignor to A. E. Poulsen & Company, Los Angeles, Calif., a corporation of California Application October 18, 1949, Serial No. 122,106

4 Claims. (Cl. 259—1)

This invention relates to machines for processing various materials and particularly to a machine or apparatus capable of mixing, blending and packaging paint ingredients, food, cosmetics, pharmaceuticals, fertilizers, insecticides, etc. The present machine has particular utility in mixing, blending, grinding and packaging grains and will be hereinafter described in this connection, by way of example.

In the preparation of grains and other materials, for general consumption, it is often necessary to first mix several ingredients or materials in a mixing machine and thereafter grind the mixed materials, blend the mixture, remove foreign matter or impurities from the mixture, and package the product for shipping. It is the usual practice to perform these steps in separate machines and to convey the materials from each machine to the next machine of the series. Attempts have been made to combine the several instrumentalities, in a single apparatus but in such cases it has been deemed necessary to locate the mixing device below the floor level so that the operator can dump the ingredients thereinto without lifting the heavy sacks of material. It is apparent that when the mixer is so located, a special foundation having a well or pit in which the mixer unit is disposed must be provided and, in addition, a relatively complex conveyor system is required to transport the mixture to the next processing unit. Even when the processing machines are combined in a unitary structure, the resulting assembly is large and occupies a large space in the manufacturing plate. Moreover, various products require different processing and for this reason it is necessary to provide several of the units, each capable of performing a different series of steps and this further adds to the cost of the equipment and necessitates additional space in the plant.

It is an important object of this invention to provide a material processing machine which combines, in a single unit, all the mechanisms necessary to perform the various processing operations, the invention providing means whereby any combination of the mechanisms can be employed, depending upon the nature of the materials to be processed and the product to be obtained.

Another object is to provide an apparatus of the character referred to which includes a relatively large mixing unit for mixing the materials, this unit, together with all the other processing units, being disposed above the floor so that a special foundation for the apparatus is unnecessary and the machine can be initially assembled on the floor of a processing plant in a minimum of time and its units can be thereafter conveniently serviced.

It is another object of the invention to provide means for loading the mixer unit, this means including a hopper disposed adjacent the floor and having a side inlet opening through which the materials or ingredients can be poured, a conveyor movable in a closed path beneath the hopper to receive the materials and movable to a location at a considerable distance above the floor to convey the unmixed materials into a chute and supply duct through which the materials flow downwardly into the mixer. By this means, the materials are systematically loaded into the mixer unit, which is disposed above the floor, without physical exertion on the part of the operator or attendant and this a very desirable feature of improvement. The invention further provides a conveyor of special construction and outline, the conveyor being movable through an endless conveyor duct and being provided with transverse blades which function to move the materials through the duct from the loading hopper to the chute which directs the materials downwardly into the mixer.

In the present apparatus, the conveyor and its duct serve the additional function of conveying the batch of mixed materials or ingredients from the mixer unit to other material processing units of the apparatus and this is also an important object. In accordance with the present concept, a screw type conveyor is provided and adapted to feed the mixture from the mixing unit into the conveyor duct to be transported to selected processing units of the apparatus. A related object is to provide a chute into which the unmixed materials can flow to be directed to the mixer unit or the mixture can be caused to flow to the processing units, such as a pulverizer, a blender, a sifter or a packaging unit, or to a combination of any of these units. In order to permit use of a single chute, this invention contemplates a chute which has a pair of branches, a manually controlled valve means being provided for selectively opening either branch and closing the other branch to either cause the unmixed materials to flow through one branch to the mixer unit or the mixture to flow to the subsequent processing units.

Another object is to provide an apparatus of the type indicated which is especially small and compact, when compared to previous apparatus proposed for this purpose; the height of the present machine being such that the machine can be installed in a building having the usual ceiling clearance.

Further objects of the invention will become apparent from the following description of the apparatus and from the drawings, which disclose a preferred embodiment by way of example, and in which.

Figure 1:
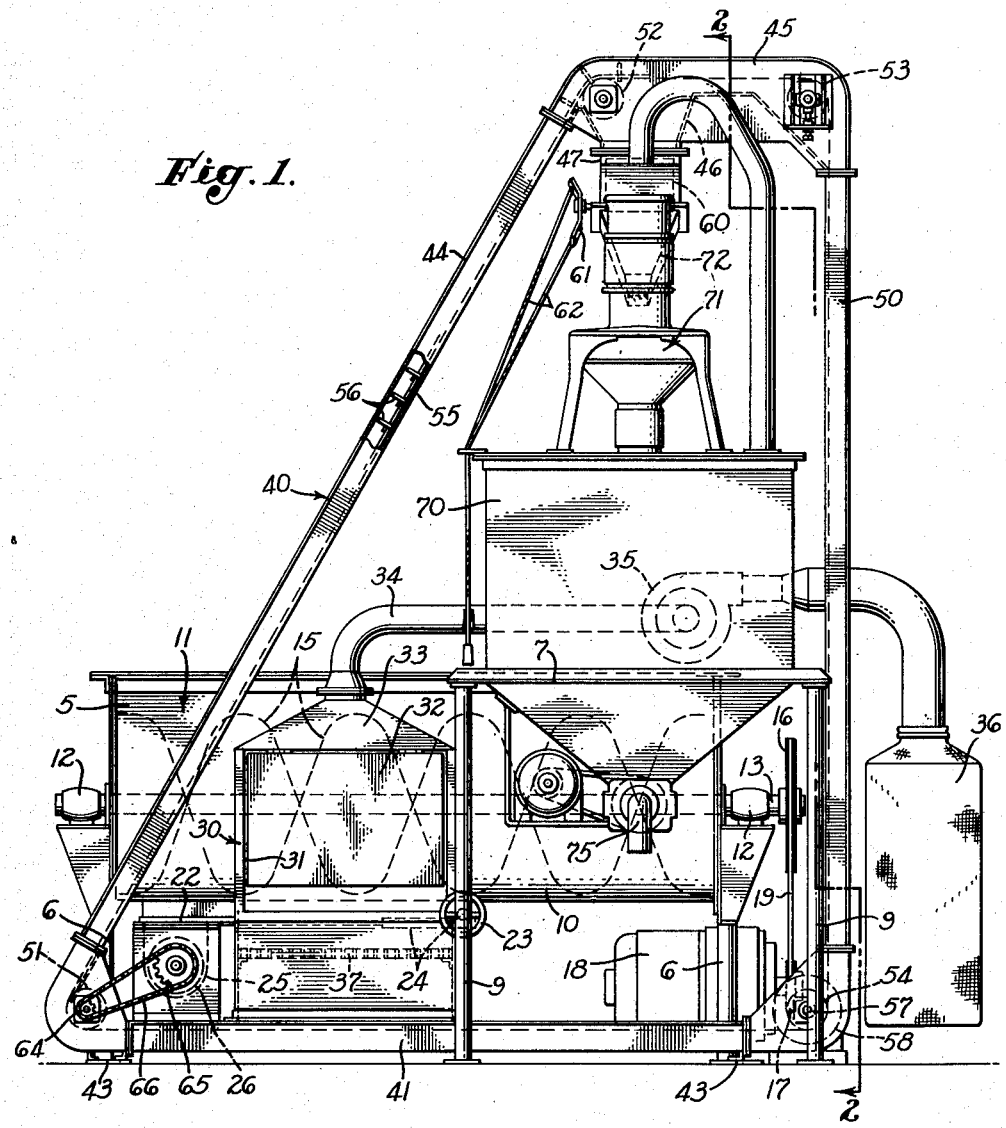
Fig. 1 is a front elevational view of the material processing apparatus.

Referring to the drawings in detail, the material processing apparatus comprises a rectangular box-like receptacle or housing 5 which is supported above the floor by means of legs 6. A shelf or platform 7 is connected to brackets 8 on the receptacle 5 and extends forwardly therefrom, the forward edge of the shelf being supported by legs 9. Thus, the parts named above constitute, in effect, a frame for supporting the various components of the apparatus.

The receptacle 5 has a rounded bottom portion 10 (Fig. 2) and constitutes the holder of a mixing machine or unit 11. Rotatable in bearing brackets 12 and extending longitudinally through the receptacle 5 is a shaft 13 which has secured thereto within the receptacle a plurality of helical mixing blades 15. A projecting end of the shaft 13 carries a sprocket 16 which is driven from a smaller sprocket 17 on the rotor shaft of an electric motor 18 through the medium of a chain 19, the motor being mounted on a fixed base 20. It is thus seen that when the motor 18 is energized, the rotary mixer element 13, 15 is rotated to mix ingredients or materials present in the receptacle 5. The materials to be mixed are introduced into the receptacle 5 through a supply duct 21 connected to the top of the receptacle. The mixture produced in the mixing unit 11 is discharged therefrom through an opening in the bottom of the receptacle 5, this discharge opening being closed during a mixing operation by a laterally slidable gate 22 capable of being slid to either closed or open position by a manual control which includes a handwheel 23 and a rack-and-pinion mechanism 24. In passing through the discharge opening, the mixture falls into a conveyor box 25 in which a rotatable screw conveyor 26 feeds the mixture lengthwise of the box and through an outlet passage at one end of the box, from which point it passes into a conveyor duct to be later described.

It will be apparent by reference to the drawings that the top of the mixer receptacle or housing 5 is located at a considerable distance above the floor so that the manual loading thereof with a batch of materials to be mixed would be extremely difficult. It is therefore an aim of this invention to provide means for automatically loading the mixing unit. Located at the front of the apparatus is a supply hopper 30 which is in the form of a box having an opening 31 in its front side through which the materials to be processed may be poured from sacks by the operator of the apparatus. A pivoted guard 32 normally partially closes the opening 31 and cooperates with the walls of the hopper 30 to provide a hood 33 at the upper end of the hopper. A suction tube 34 is connected to the hood 33 and to a blower 35 which functions to draw dust laden air from the hood, the particles of dust and other foreign matter being retained in a bag 36 connected to the discharge side of the blower. Materials, such as grains, placed in the hopper 30 pass downwardly through a screen 37 and discharge through the open bottom end of the hopper and are conveyed therefrom to the mixer unit 11 by means to be next described.

Figure 2:
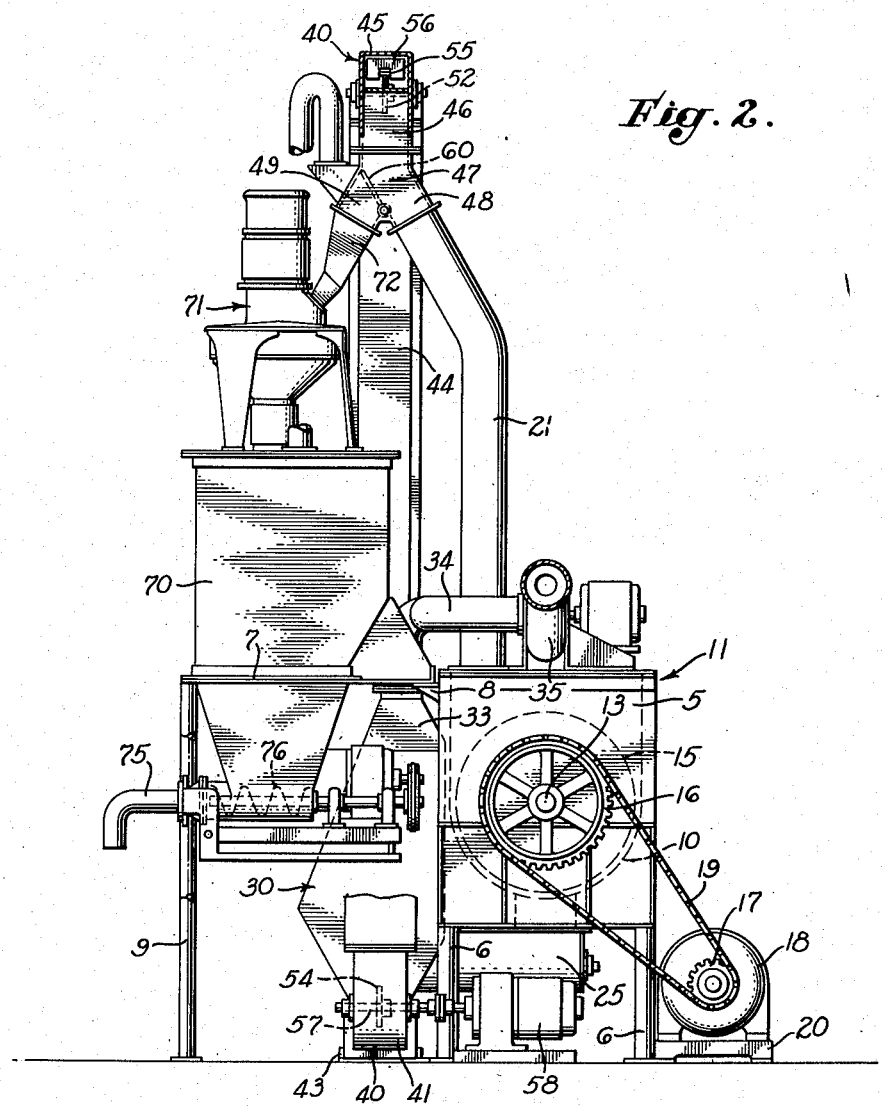
Fig. 2 is a vertical sectional view, taken on line 2—2 of Fig. 1.

An endless conveyor duct 40 of rectangular cross-sectional shape has a lower horizontal portion 41 disposed directly beneath the outlet end of the supply hopper 30 and has an opening registering therewith so that the grains or other materials pass from the hopper into the conveyor duct. The lower portion 41 of the duct 40 is similarly connected to the bottom of the conveyor box 25 to adapt it to receive the mixed materials which are fed into the box 25 by the screw conveyor 26 when the gate 22 is in open position. The lower portion 41 of the conveyor duct 40 may be supported by feet 43 which rest upon the floor and which are suitably connected to the legs 6 of the mixer unit 11. At a point adjacent the discharge end of the mixer unit 11, the conveyor duct 40 extends upwardly and toward the right, as viewed from the front, in an inclined portion 44. The upper end of the inclined portion 44 is disposed at a considerable distance above the mixer unit 11 and joined to this end is an upper horizontal portion 45, the lower wall of which is provided with a flanged outlet spout 46 to which is connected an inverted Y-shaped fitting or chute 47 having diverging branches 48 and 49 (Fig. 2). The branch 48 is connected to the upper end of the supply duct 21. A vertical duct portion 50 is connected between the corresponding right-hand ends of the horizontal portions 41 and 45 and thus completes the closed conveyor duct circuit. At the intersections of the various portions 41, 44, 45 and 50 the duct is curved as shown in Fig. 1 and rotatable in these curved sections are sprockets 51, 52, 53, and 54.

Extending through the conveyor duct 40 and around the several sprockets 51, 52, 53 and 54 is a conveyor chain 55 which carries spaced impeller blades or vanes 56. The sprocket 53 is adjustably mounted in order to take up slack in the chain 55. The sprocket 54 is carried by a shaft 57 which is connected to the rotor shaft of an electric motor 58 mounted on the floor. It is thus seen that when the motor 58 is energized, the endless conveyor chain 55 is caused to travel through the duct 40 in clockwise direction, as viewed in Fig. 1, and that its blades 56 push the unmixed grains or other materials upwardly through the inclined portion 44. As the material approaches the upper horizontal portion 45, it falls into the spout 46 and chute 47.

As shown in Fig. 2, a flap valve 60 is pivoted within the chute 47 and is adapted to be swung to a first position to open the branch 48 and close the branch 49, and to a second position to open the branch 49 and close the branch 48. During the charging of the mixer unit 11 with materials to be mixed, the valve is pivoted to said first position, by means of a lever 61 and manually operable cords 62, so that the unmixed materials are permitted to flow downwardly through the supply duct 21 into the mixer.

It has been explained that after the materials have been loaded into the mixer unit 11 and thoroughly mixed therein, the mixture is fed by a screw conveyor 26 into the conveyor duct 40 to be fed upwardly through the inclined portion 44 of the duct by the conveyor 55, 56 and discharged into the spout 46 and permitted to flow through the branch 49 of the chute 47. As shown in Fig. 1, the screw conveyor 26 may be conveniently driven from the sprocket 51 by means of sprockets 64 and 65 and a chain 66.

After the batch of material has been suitably mixed, it may be further processed by subjecting it to a pulverizing, sifting or blending operation or a combination of any of these processes. Since the processing units for effecting these steps are well known in the art, they are not shown or described in detail herein. Supported on the platform 7 is a discharge hopper or bin 70, and mounted on the top of the bin is a material processing unit 71 which, for example, may be a blender unit capable of intimately blending finely ground ingredients. The unit 71 may receive the material from the branch 49 of the chute 47 through a tube (Fig. 2). In place of the blender unit 71, a sifter unit, a pulverizer unit or any other material processing device may be employed and readily mounted upon the top of the bin 70. The lower end of the bin 70 is tapered and has a spout 75 through which the fully processed grain or other material may be discharged into suitable boxes, bags or other shipping containers by a screw conveyor 76 (Fig. 2).

It is to be particularly noted that the present material processing apparatus is especially compact in size and for this reason occupies a minimum of space. The apparatus is automatic in operation, it being only necessary to dump the unprocessed materials into the supply hopper 30 to charge the mixer unit 11, and to later open the gate 22 and shift the valve 60 to cause the mixture to be delivered to the other processing units. Thus, a single operator can attend the apparatus. By the present invention, it is possible to arrange the mixer unit above the floor and still make it possible for a workman to load the same without lifting the sacks of material through any appreciable height and without requiring the workman to climb upon a platform. Consequently, since the machine can be quickly charged and is automatic in operation, the productive rate is substantially increased over other apparatus heretofore employed.

It will be apparent to those skilled in the material processing art that the present apparatus, as herein disclosed, is susceptible of various modifications which would fall within the spirit and scope of this invention. For this reason, I do not wish to be limited in this respect, but desire to be afforded the full scope of the appended claims.

I claim as my invention:

1. In a material-processing machine, the combination of: a mixing machine including a receptacle in which materials can be mixed; a material supply duct connected to said mixer and adapted to direct unmixed materials into said mixer, said duct having an open upper end; a supply hopper for receiving unmixed materials and having a discharge opening at its bottom; an endless conveyor duct extending beneath said hopper and communicating with said discharge opening thereof, said conveyor duct extending horizontally above said open end of said supply duct and therebeyond and having a Y-shaped chute provided with diverging branches, one of which communicates with said supply duct; a valve movable within said chute to a first position to open said one of said branches and to close the other of said branches, and to a second position to close said one of said branches and to open said other of said branches; an endless conveyor element movable within said conveyor duct and provided with longitudinally-spaced transverse vanes adapted, when said element is propelled through said conveyor duct, to push the material therethrough; driving means for propelling said conveyor element; means defining a passage communicating between said receptacle and said conveyor duct and through which the mixed material can discharge from said receptacle into said conveyor duct; and movable gate means within said passage for controlling the discharge of the mixed material from said receptacle into said conveyor duct.

2. In a material-processing machine, the combination of: a mixing machine including a receptacle in which materials can be mixed; a material supply duct connected to said mixer and adapted to direct unmixed materials into said mixer, said duct having an open upper end; a supply hopper for receiving unmixed materials and having a discharge opening at its bottom; an endless conveyor duct extending beneath said hopper and communicating with said discharge opening thereof, said conveyor duct extending horizontally above said open end of said supply duct and therebeyond and having a Y-shaped chute provided with diverging branches, one of which communicates with said supply duct; a valve movable within said chute to a first position to open said one of said branches and to close the other of said branches, and to a second position to close said one of said branches and to open said other of said branches; an endless conveyor element movable within said conveyor duct and provided with longitudinally-spaced transverse vanes adapted, when said element is propelled through said conveyor duct, to push the material therethrough; driving means for propelling said conveyor element; means defining a passage communicating between said receptacle and said conveyor duct and through which the mixed material can discharge from said receptacle into said conveyor duct; movable gate means within said passage for controlling the discharge of the mixed material from said receptacle into said conveyor duct; and a rotary screw conveyor in said passage for feeding the mixed material from said receptacle into said conveyor duct.

3. In a material-processing machine, the combination of: a mixing machine including a receptacle in which materials can be mixed; a material supply duct connected to said mixer and adapted to direct unmixed materials into said mixer, said duct having an open upper end; a supply hopper for receiving unmixed materials and having a discharge opening at its bottom; an endless conveyor duct extending beneath said hopper and communicating with said discharge opening thereof, said conveyor duct extending horizontally above said open end of said supply duct and therebeyond and having a Y-shaped chute provided with diverging branches, one of which communicates with said supply duct; a valve movable within said chute to a first position to open said one of said branches and to close the other of said branches, and to a second position to close said one of said branches and to open said other of said branches; an endless conveyor element movable within said conveyor duct and provided with longitudinally-spaced transverse vanes adapted, when said element is propelled through said conveyor duct, to push the material therethrough; driving means for propelling said conveyor element; means defining a passage communicating between said receptacle and said conveyor duct and through which the mixed material can discharge from said receptacle into said conveyor duct; movable gate means within said passage for controlling the discharge of the mixed material from said receptacle into said conveyor duct; a rotary screw conveyor in said passage for feeding the mixed material from said receptacle into said conveyor duct; and means for rotating said screw conveyor in synchronism with the speed of travel of said conveyor element.

4. In a material-processing machine, the combination of: a mixing machine including a receptacle in which materials can be mixed; a material supply duct connected to said mixer and adapted to direct unmixed materials into said mixer, said duct having an open upper end; a supply hopper for receiving unmixed materials and having a discharge opening at its bottom; an endless conveyor duct extending beneath said hopper and communicating with said discharge opening thereof, said conveyor duct extending horizontally above said open end of said supply duct and therebeyond and having a Y-shaped chute provided with diverging branches, one of which communicates with said supply duct; a valve movable within said chute to a first position to open said one of said branches and to close the other of said branches, and to a second position to close said one of said branches and to open said other of said branches; an endless conveyor element movable within said conveyor duct and provided with longitudinally-spaced transverse vanes adapted, when said element is propelled through said conveyor duct, to push the material therethrough; driving means for propelling said conveyor element; means defining a passage communicating between said receptacle and said conveyor duct and through which the mixed material can discharge from said receptacle into said conveyor duct; movable gate means within said passage for controlling the discharge of the mixed material from said receptacle into said conveyor duct; a rotary screw conveyor in said passage for feeding the mixed material from said receptacle into said conveyor duct; and a driving means operatively between said conveyor element and said screw conveyor by which screw conveyor is rotated in synchronism with the speed of travel of said conveyor element.

ALFRED E. POULSEN.

REFERENCES CITED

The following references are of record in the file of this patent:

UNITED STATES PATENTS

| Number | Name | Date |
|---|---|---|
| 820,867 | Henninger | May 15, 1906 |
| 1,089,052 | Hess | Mar. 3, 1914 |
| 1,363,823 | Sturtevant | Dec. 28, 1920 |
| 1,478,867 | Bausman | Dec. 25, 1923 |
| 1,561,777 | Dowdall | Nov. 17, 1925 |
| 1,787,161 | Neighbour et al. | Dec. 30, 1930 |
| 2,285,765 | Carswell | June 9, 1942 |
| 2,475,382 | Erickson | July 5, 1949 |
| 2,482,159 | Delivuk | Sept. 20, 1949 |

FOREIGN PATENTS

| Number | Country | Date |
|---|---|---|
| 14,115 | Great Britain | Oct. 25, 1884 |
| 884,556 | France | Apr. 27, 1943 |